United States Patent [19]
Kastenbein

[11] 3,902,427
[45] Sept. 2, 1975

[54] ELEVATOR AND SELF PROPELLED CARRIER MEANS MOVABLE ON POSITIONABLE RAILS

[75] Inventor: Werner Kastenbein, Zurich, Switzerland

[73] Assignee: Hans Ingold & Co., Switzerland

[22] Filed: Jan. 10, 1973

[21] Appl. No.: 322,309

[30] Foreign Application Priority Data
Jan. 14, 1972  Switzerland............................ 494/72

[52] U.S. Cl.................. 104/88; 214/16.4 R; 198/38
[51] Int. Cl................................................ B61j 3/00
[58] Field of Search...................... 104/88, 127–129, 104/48; 214/16.1 DD, 16.4 R; 198/38

[56] References Cited
UNITED STATES PATENTS

| | | | |
|---|---|---|---|
| 949,228 | 2/1910 | Greene | 104/129 |
| 2,693,770 | 11/1954 | Hubscher | 214/16.1 C |
| 3,483,829 | 12/1969 | Barry | 104/88 |

*Primary Examiner*—Frank E. Werner
*Assistant Examiner*—R. B. Johnson
*Attorney, Agent, or Firm*—Hill, Gross, Simpson, Van Santen, Steadman, Chiara & Simpson

[57] ABSTRACT

A three-dimensional operating conveyor installation wherein rail strands arranged in superimposed transport planes are operatively connected with one another by at least one elevator equipped with revolving entrainment means. Mobile transport containers each equipped with their own drive unit and guided along the rails of the individual strands can be introduced into the path of travel of the entrainment means and coupled therewith.

13 Claims, 7 Drawing Figures

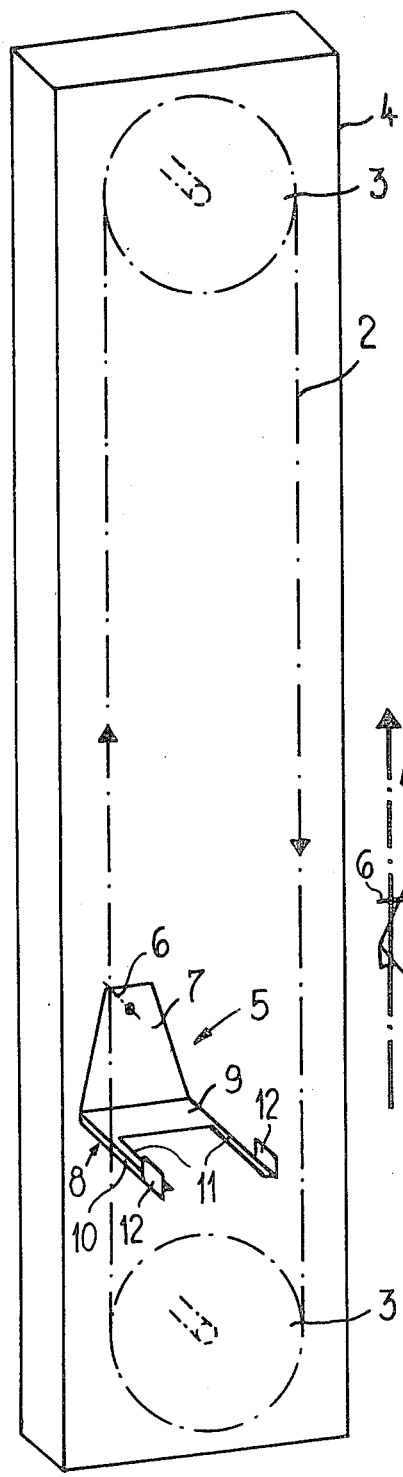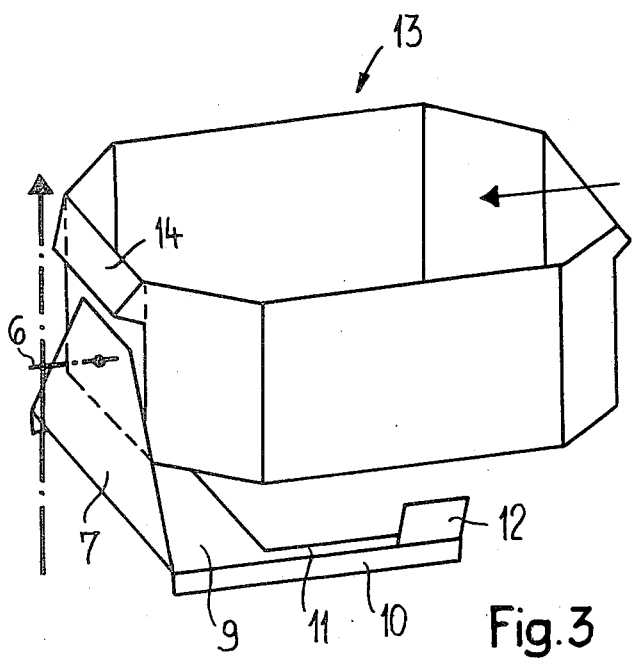

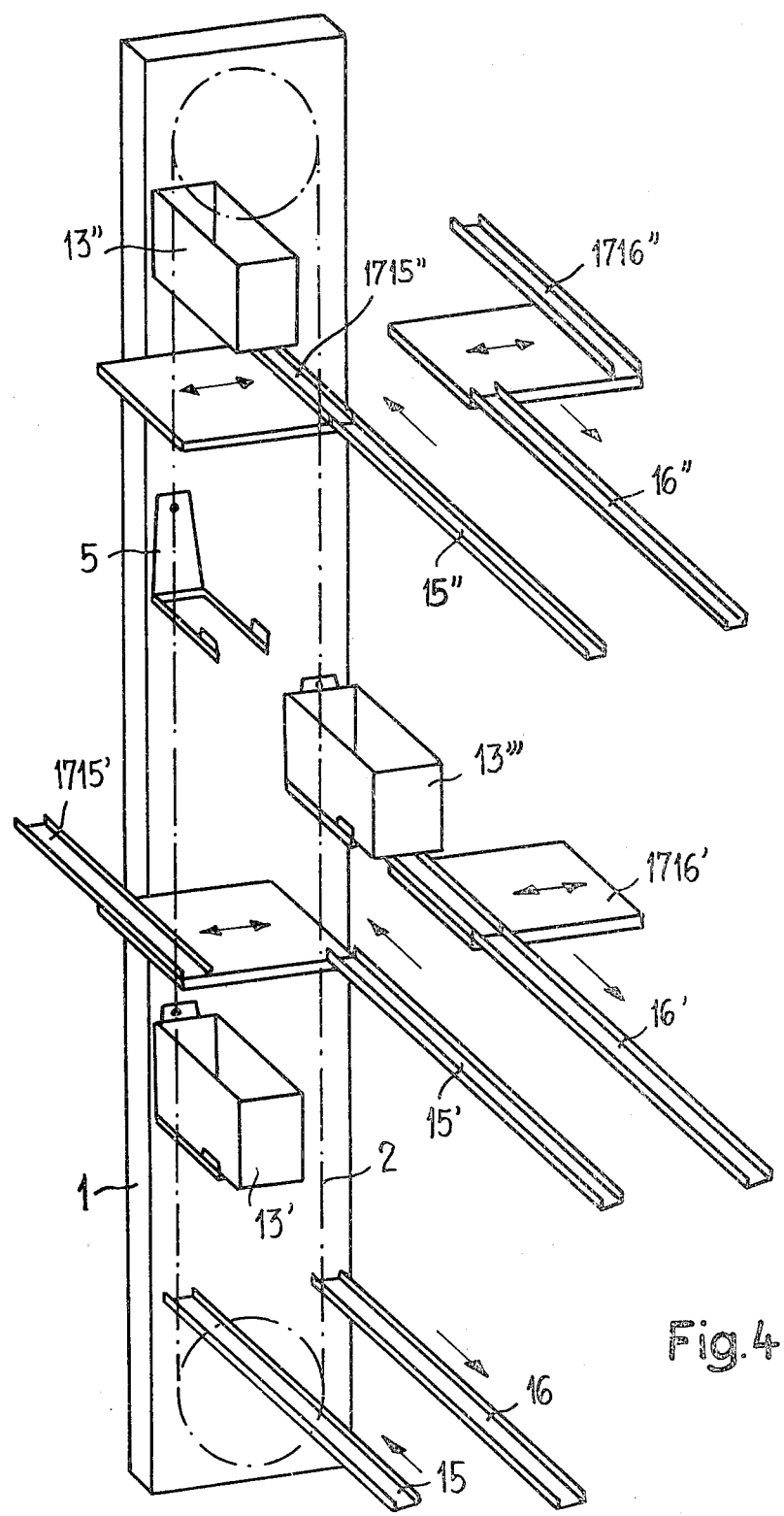

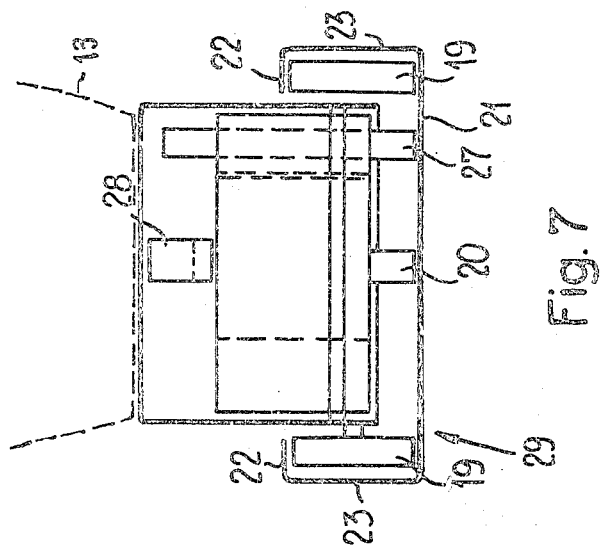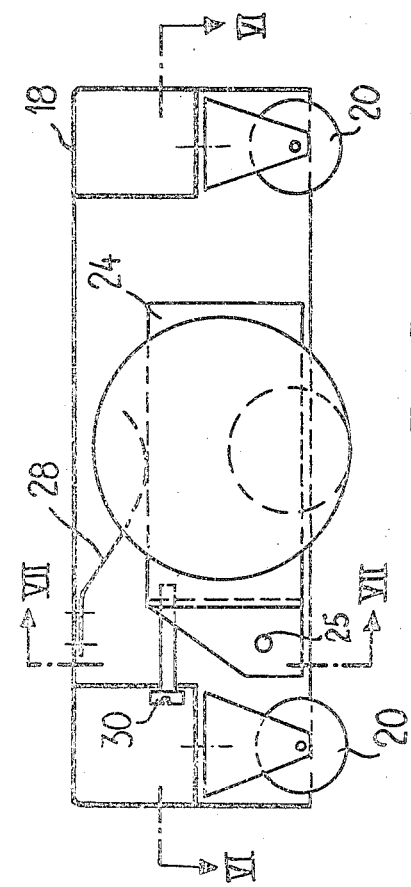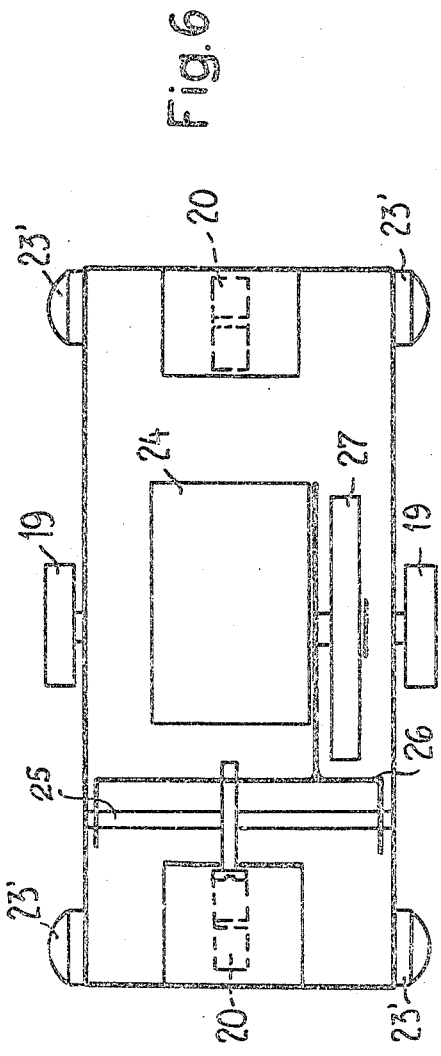

ELEVATOR AND SELF PROPELLED CARRIER MEANS MOVABLE ON POSITIONABLE RAILS

BACKGROUND OF THE INVENTION

The present invention relates to a new and improved construction of three-dimensional operating conveyor installation.

A prior art three-dimensional operating conveyor installation contemplates that the material to be conveyed which possibly is accommodated in transport containers or the like is conveyed in horizontal or essentially horizontal direction by driven conveyor bands, rollers, conveying lines or equivalent or the same type of mechanism and in vertical direction by means of elevators or lifts. Viewed in an abstract fashion such installations consist of a driven horizontal conveyor said a likewise driven vertical conveyor, the conveyed material and/or the transport containers carrying out a purely passive role with regard to the contemplated positional change.

On the other hand, there are also known to the art three-dimensional functioning conveyor installations wherein there are provided transport containers. Each such transport container is equipped with its own drive unit supported and guided along rails. In this case the rails also possess vertical sections which are connected with the remaining more or less horizontally extending track sections by curved members. In such installations the specific conveying capacity or volume is limited since the elevational displaced of the transport container at the vertical track sections requires a relatively great drive output and therefore large heavy and expensive drive units. Also the rails must be in a form-locking driving connections with the drive units and accordingly are of complicated and expensive design.

This type of drive connection also can result in notable problems in the curved track sections if the radius of curvature falls below a certain value. The existing problems, depending upon whether the rails are bent in a vertical or in a horizontal plane, are of different nature. For the same reasons, namely however also in the interest of realizing as small as possible radius of the curves the tranport containers must be designed to be relatively small in size. It has been found that the active role of the transport containers equipped with their own drive units both in the horizontal as well as in the vertical conveying directions do attempt to avoid the clumsiness of a drive by conveyor bands and the like and by elevators, but at the same time have associated therewith new problems and new limitations.

SUMMARY OF THE INVENTION

Hence, it is a primary object of the present invention to provide an improved construction of three-dimensional operating conveyor installation which is not associated with the aforementioned drawbacks and limitations of the heretofore discussed prior art proposals.

Now in order to implement this objective and others which will become more readily apparent as the description proceeds, the three-dimensional operating conveyor installation of this development is manifested by the features that track or rail strands which are arranged in superimposed transport planes are connected with one another by at least one elevator or lift equipped with revolving entrainment means. Mobile transport containers which are guided along the rails of the individual strands and each being propelled by its own drive unit can be introduced into the path of movement of the entrainment means and coupled therewith.

This design in comparison to the previously mentioned known conveyor installations affords a new concept inasmuch as the transport containers play an active role in the horizontal direction, on the other hand a passive role in the vertical direction. Consequently, there is realized first of all that the individual drive units of the transport containers need only overcome the horizontal transporting or conveying action and accordingly can be designed to be light and economical, or conversely, considered such point of view the specific conveying capacity and in particular the dimensions and the weight of the individual transport containers are not as a practical manner subjected to any limits. Of equal importance is the fact that the transition from a horizontal to a vertical track or rail section can be accomplished with the smallest possible curve radius, namely with a curve radius amounting to null, since the provided elevator renders superfluous the use of curved transition paths.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 diagrammatically illustrates details of the elevator or lift mechanism of the conveyor installation depicted in FIG. 1:

FIG. 3 diagrammatically illustrates on an enlarged scale a transport container or receiver and entrainment means of the elevator mechanism depicted in FIG. 2:

FIG. 4 diagrammatically illustrates a conveyor installation incorporating track systems arranged in three superimposed transport planes:

FIG. 5 diagrammatically illustrates a side view of the carriage or wagon of a container carrier.

FIG. 6 is a diagrammatic cross-sectional view of the arrangement of FIG. 5, taken substantially along the line VI—VI thereof; and FIG. 7 is a diagrammatic cross-sectional view of the arrangement depicted in FIG. 5 taken substantially along the line VII—VII thereof showing in cross-section the track or rail (not particularly illustrated in FIG. 5) as well as schematically depicting a transport container which has been placed upon the carriage and drive unit.

DETAILED DESCRIPTION OF THE PREFERRED EMBODIMENTS

Figure 1:
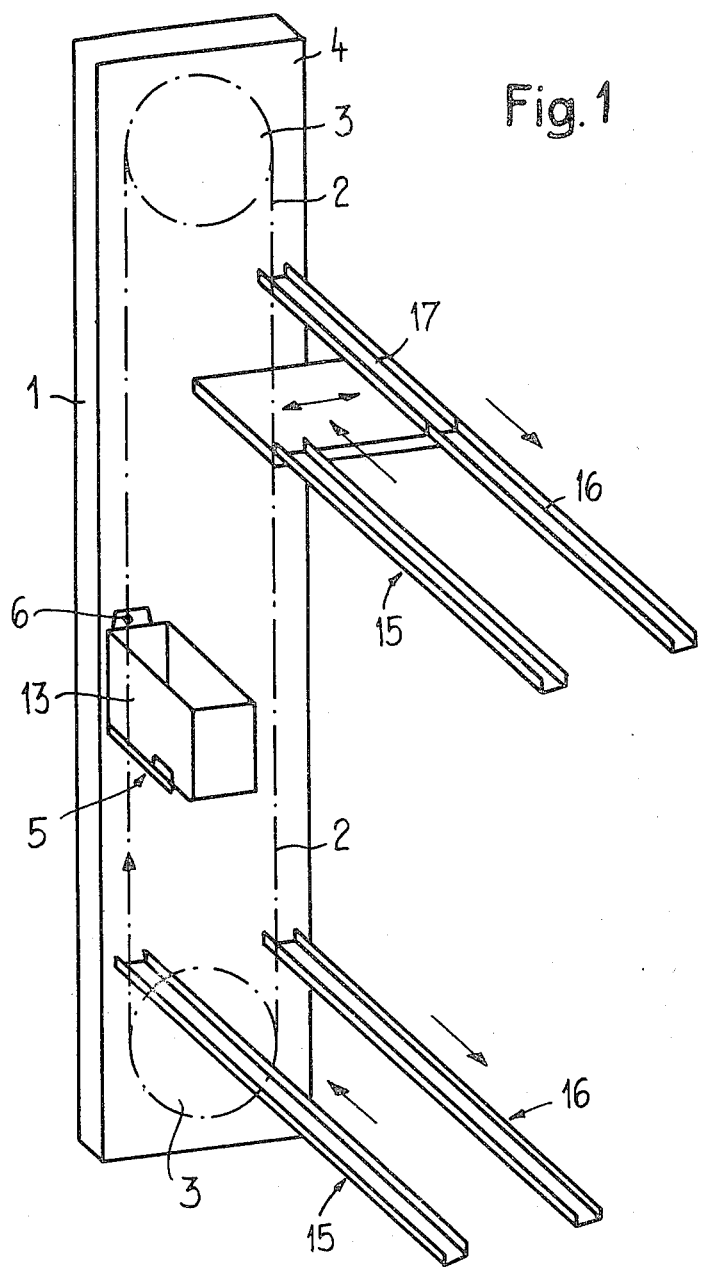
FIG. 1 illustrates a diagrammatic view of a conveyor installation of this development incorporating track systems arranged in two superimposed transport planes.

Considering now the exemplary embodiment of conveyor installation depicted in FIG. 1 it will be seen that the elevator mechanism, generally designated by reference character 1, comprises an endless conveyor chain 2, the runs of which extend vertically between the sprocket wheels or gears 3 about which is trained such conveyor chain 2. This chain 2 and the sprocket wheels 3 are housed in a suitable schematically depicted housing 4, which combines together into a mountable unit the individual components of the elevator mechanism, and if desired including the non-depicted drive motor thereof. This mountable unit extends between the individual stores and can be easily mounted at the wall of a building. Entrainment means 5 are arranged in spaced relationship along the conveyor chain 2 and each entrainment means 5 is pivotably mounted on the conveyor chain on a horizontal shaft or axis 6.

Continuing, it will be recognized that each entrainment means 5 incorporates a shield or plate 7 which extends downwardly from the point of anchoring thereof and at its lower end carries a forked or bifurcated horizontally directed overhang or bracket 8. As seen by referring to FIG. 2, and particularly well by referring to FIG. 3, the overhang or bracket 8 possesses at the region neighboring the upstanding shield or plate 7 a substantially plate-shaped support 9 having parallel legs 10 having inwardly extending support portions 11 which extend along the legs 10 of the bracket 8. At the free end of each leg 10 there is seated a respectively upwardly directed contact or impact plate 12. As should be apparent from the showing of FIG. 3, a transport container 13, and a transport carriage 18 upon lifting of the transport container and carriage by the elevator mechanism, the carriage 18 is seated upon the support 9 and at its projections or extended portions 11 between the impact or stop plates 12 which fixedly secure the transport container against lateral shifting. In the direction of the elevator mechanism the shield or upstanding plate 7 forms a stop for the transport container, the movement of which in the opposite direction is suppressed by a somewhat inclined positioned impact plate 14 which engages behind the upper end of the shield 7. The described measures provide a formlocking connection between a transport container 13 and an entrainment mechanism 5, and which formlocking connection does not permit of any other relative movement between the transport container and the entrainment mechanism other than a removal of the entrainment mechanism from the transport container towards the bottom, or lifting of the transport container from the entrainment mechanism.

As best seen by referring to FIG. 1, the track or rail systems possess in both planes two rail strands each of which is directed towards one run of the elevator mechanism 1. The track or rail strand designated by reference character 15 and which is directed towards the upwardly moving run of the conveyor chain 2 serves as the departure path, as will be considered more fully hereinafter. Consequently, the other track or rail strand 16 has the function of the arrival or incoming path. In contrast to the lower situated track system the rail strands 15 and 16 of the upper track system do not extend completely upto the region of the elevator mechanism, rather in this instance there is provided a switch element 17 which is guided to be transversely displaceable with respect to the rail strands 15 and 16 and serves as an extension of the one or the other strand in the direction of the elevator mechanism 1.

The functional description of the equipment to be given hereinafter is based initially upon the assumption that a transport container is to be conveyed from the lower into the upper story. For this purpose the transport container is initially place upon its carriage which has not been illustrated in the heretofore described Figures but will be considered hereinafter, upon the rail strand 15 of the lower track system and until reaching the region of the elevator mechanism 1. At this location the relevant transport container remains until an entrainment mechanism arriving at the "upward" extending run of the conveyor chain 2 engages beneath such transport container and carriage and lifts such from the rail and, as illustrated in FIG. 1, moves such upwards. The switch element 17, as depicted in the drawing, is located in alignment with the rail strand or rail 16 of the upper track system. For this purpose there can be provided any suitable automatic switch mechanism which therefore has not been particularly illustrated, and which responds to the approaching of a transport container and shifts the switch element 17 into the depicted position. The upwardly conveyed transport container 13, after passing through the apex or top of the conveyor chain 2 arrives at the "downward" extending run thereof and is placed with its carriage upon the switch element 17. The further downwardly moving entrainment mechanism 8 now releases the tranport container 13, and carriage so that such can be shifted onto the rail 16 of the upper track system. These operations occur in analogous fashion when a transport container should be deposited from the upper track system to the lower track system. Such transport container approaches the elevator mechanism along the rail 15 of the upper track system, and the switch element 17 again, if desired, can be shifted by the switch mechanism which responds automatically to the approach of a transport container into alignment with the rail or rail strand 15 of the upper track system. After the transport container has been engaged by the seitch element and therefore brought into the path of movement of the entrainment mechanism 5 of the upwardly extending run of the conveyor chain 2, conveyed over the top or apex of the conveyor chain 2 and brought to the location of the downwardly extending run thereof it is finally deposited upon the rail 16 of the lower track system. From what has been discussed above it should be apparent that the entrainment mechanisms of the elevator or elevator mechanism move in a one way traffic system. The same is basically also true for the transport containers, wherein the incoming paths and departure paths of the individual track system can be operatively coupled with one another by displacement switches having switch elements 17 which can be shifted into the region of the one or the other rail.

Now in consideration of the already described construction of the conveyor installation the transport containers advantageously may be carried by a carriage or wagon 18 constructed in the manner diagrammatically depicted in FIGS. 5 to 7. The carriage or wagon, generally designated by reference character 18, possesses traveling wheels 19 extending at its transverse axis and arranged at each side of the carriage 18, and furthermore, apart from such pair of traveling wheels 19 each carriage possesses a pair of guide wheels 20, each of which is arranged at one end of the carriage 18 in its lengthwise axis. The rails, as best seen by referring to FIG. 7, possess the shape of a sharp-cornered C, wherein the central or intermediate web 21 of the relevant rail 29 functions as a traveling web for the traveling wheels 19 and the guide wheels 20. The traveling wheels 19 are additionally engaged by inwardly flexed or turned marginal edges or borders 22 of the relevant rail 29. It should be understood that at the region of the switch element 17, at least at the region of their ends neighboring the elevator mechanism these marginal edges or borders 22 are dispensed with to enable the wheels 19 and carriage to be lifted from or deposited on the switch element.

It should be readily appreciated that the described arrangement of the traveling wheels 19 arranged along the transverse axis of the carriage and the guide wheels 20 arranged along the lengthwise axis of the carriage provide an extremely simple mechanism for decoupling, but particularly also coupling the transport container with the rails. In particular, inclined positions of the transport container about its elevational axis, lengthwise axis or transverse axis with respect to the associated rail and within limits, which considerably exceed the tolerance brought about by the operation of the system, are without any real significance. In particular, the rail, including the displaceable switch element, need not be aligned with extreme accuracy at the relevant run of the elevator mechanism and furthermore need not be exactly adjusted in all possible directions. In this regard, apart from the wheel arrangement there also plays an important role the fact that for the lateral guiding of the carriage in the rail there are provided laterally arranged sliding elements 23' which cooperate with the lateral flanges 23 of the rail, and which at the region of the elevator, more specifically stated, at the region of the path of movement of the entrainment mechanism possess a larger mutual spacing than corresponds to the rail profile and can strive to move apart in the direction of the rail and also upwards.

The drive unit 24 provided for advancing the transport container along the associated rail is secured to a balance beam or rocker 26 which is hingedly connected at location 25 at the carriage 18. This drive unit 24 possesses a friction wheel 27 which under the action of the weight of the drive unit 24 and a spring 28 downwardly loading such wheel 27, engages the latter at the traveling web 21 of the rail 29 shown in FIG. 7. The pivotability of the balance beam or rocker 26 is limited by an adjustable stop 30. This is particularly necessary for the reasons that the spring 28 dimensioned for generating the friction necessary for advancing the fully loaded transport container can cause lifting of the traveling wheel 19 neighboring the friction wheel 27 which has been offset with respect to the lengthwise axis of the carriage, when the container is not fully loaded by the weight to be transported. What is to be particularly remarked about in this regard is that in such case the carriage is then supported at the friction wheel 27, at the remote traveling wheel 19 and at one of the guide wheels 30, that is to say is supported at only three locations upon the traveling web 21 of the rail 29, wherein the traveling wheel 19 neighboring the friction wheel 27, depending upon the adjustment of the stop 30, can be raised upto the marginal border or edge which engages thereover. In consideration thereof this marginal edge or border — and possibly also the other one — has imparted thereto a ramp-shaped course at its end region confronting the elevator mechanism. While taking into account the convergent construction of the rail flanges at the same region it can be stated that at such location the rail possesses a funnel-like construction. The described arrangement, in connection with the foregoing observations is of particular significance insofar as thereby the contact pressure of the friction wheel at the traveling web of the rail and therefore the friction which is decisive for the transmission of the driving output at the region of the elevator mechanism is reduced, so that at such regions there is produced an actual slip drive. Consequently, braking of the transport container which is moving towards the elevator mechanism into the preparatory or waiting position in any case can be markedly simplified, possibly even completely eliminated. On the other hand, the problems during deposition of the transport container at its incoming or arrival path are markedly simplified. The drive unit receives its drive energy through the agency of slip contacts which upon deposit of the transport container come into contact with non-illustrated current rails located at the traveling web of the rail. The possible drive slip at the incoming or arrival path renders possible a direct placing into operation of the drive unit by the deposition of the transport container upon the tail and a subsequent gentle departure of the transport container, wherein the slip, as soon as the raised traveling wheel comes into engagement with the ramp-shaped extending marginal edge or border 22, gradually reduces and at the end is completely eliminated. The friction wheel and the therewith neighboring traveling wheel thus ensure a resilient vertical guiding of the transport container along the rail. However, in order to make complete use of the adherent possibilities of the described arrangement the contact force of the friction wheel which is exerted by the spring 28 can be advantageously selected such that it also tends to bring about, with a fully loaded container, a raising of the traveling wheel 19 neighboring the friction wheel 27. In any event even if such traveling wheel is not raised, still it will be relieved of load, so that the container bears upon the traveling web of the rail in the sense of a three-point support and therefore possesses a clear stable contact and additionally good guiding or steerability.

In FIG. 4 there is illustrated a conveyor installation with three superimposed transport planes. The departure- and arrival paths in the lowermost transport plane are again designated by reference characters 15 and 16, those at the intermediate transport plane by reference characters 15' and 16' respectively, and finally those in the upper transport plane by reference characters 15'' and 16'' respectively. While it would be of course possible to provide simple switches at the intermediate and upper transport planes in accordance with the showing of FIG. 1, still an increase in the capacity and flexibility of the conveyor installation can be realized due to the arrangement of double switches which possess for each rail or rail strand an individual switch element. In order to render clear their association the switch elements have been designated in FIG. 4 with reference characters 1715', 1716', 1715'' and 1716'' respectively. The switch element 1715' can be displaced out of its illustrated position into alignment with the rail 15'. The same is true in analogous fashion for the remaining switch elements as related to their associated rail.

FIG. 4 illustrates a transport container 13' and its carrier which has been retrieved by the elevator mechanism 1 from the departure path 15 of the lowermost transport plane and is now in a position where it can pass the intermediate transport plane. For this purpose the switch element 1715' is shifted to one side. Upon the switch element 1715'' at the upper transport plane there is waiting a transport container 13'' and its carrier for further conveying by an approaching entrainment mechanism 5. The switch element 1716'' at the upper transport plane has likewise been shifted to one side, to render possible the preceding throughpassage of a further transport container 13'41, which in turn has just been placed upon the switch element 1716' located in alignment with the incoming rail 16' of the intermediate transport plane. The switch element 1716'' of the upper transport plane remains in its illustrated position provided that the container 13'' is not destined to be deposited upon the upper transport plane, but in such case this switch element would then be brought into alignment with the incoming rail of such transport plane if the destination of the aforementioned container 13'' is that of the upper transport plane. Should however such container arrive at the lower transport plane then at the appropriate time the switch element 1716' will be shifted to the side in order to render possible the throughpassage of the container. Shifting of the switch elements can occur in each transport plane with the aid of a non-illustrated switching mechanism which can be controlled by target markers or the like, as is well known in the art, which are applied to the relevant transport containers, but the control can also occur in any other suitable fashion. Moreover, in this case what has been discussed above with regard to the other Figures can be applied in analogous fashion.

While there is shown and described present preferred embodiments of the invention, it is to be distinctly understood that the invention is not limited thereto but may be otherwise variously embodied and practiced within the scope of the following claims.

Accordingly, what is claimed is:

1. In a three-dimensional operating conveyor,
an endless elevator means having an uprunning run and a downrunning run,
laterally spaced rails arranged in superimposed transport planes and positionable in alignment with said uprunning and downrunning runs,
entrainment means pivoted to said elevator means in spaced relation with respect to each other and movable into and beyond the transport planes of the rails, and having supporting surfaces maintained in horizontal positions by gravity,
carrier means movable along said rails onto and from said entrainment means,
container means on said carrier means and moved thereby into different planes by said elevator means,
each carrier means having its own drive unit guided along the individual strands of the rails and introduceable into the path of the entrainment means to be detachably supported thereon, to elevate or lower the container means upon elevating or lowering movement of the entrainment means and to move said carrier means along said rails,
each entrainment means forming a stop for a container, and a locking connection between the entrainment means and container and locking the container and carrier from horizontal movement relative to the entrainment means, during vertical movement thereof into different elevations.

2. The conveyor installation as defined in claim 1, wherein each entrainment means comprises a vertical stop plate and a respective substantially bifurcated-shaped horizontally directed overhang extending from the bottom of said plate, said elevator means comprises an endless revolving conveyor chain, and the pivotal mounting means is arranged adjacent to the upper end of said plate for pivotally securing each entrainment means to the revolving endless conveyor chain to retain the overhang in a generally horizontal position.

3. The conveyor installation as defined in claim 2, wherein each entrainment means is equipped with means for establishing from below a form-locking engagement with a carrier means and a transport container thereon.

4. The conveyor installation as defined in claim 3, wherein said overhang includes upwardly protruding side stop means, and wherein said establishing means of said entrainment means and means provided at the transport container define cooperating components to establish said form-locking engagement between the entrainment means and the associated carrier means and transport container with respect to the lengthwise direction of the overhang.

5. The conveyor installation as defined in claim 4, wherein the plate member of the entrainment means extends downwardly from the mounting means defining the pivot axis for said plate member which carries at its lower end the support member of said overhang, and the associated entrained transport container having stop means engageable with the upper end of said plate member to be supported thereby.

6. The conveyor installation as defined in claim 1, wherein the rails in the individual transport planes possess a departure rail section which extends towards an upwardly extending run of the elevator means and an arrival section which extends towards the downwardly extending run of the elevator means, and wherein the terminal portions of said sections, with the exception of those of the lowermost transport plane, are constructed as laterally shiftable switch element means.

7. The conveyor installation as defined in claim 6, wherein the switch element means can be alternately shifted into alignment with the departure section or the arrival section of the relevant rails.

8. The conveyor installation as defined in claim 7, wherein the switch element means can be controlled by mechanism responsive to target information stored at the transport containers.

9. The conveyor installation as defined in claim 1, wherein the transport container carriers are equipped with two traveling wheels arranged along their transverse axis and two guide wheels arranged each to one side of the transverse axis along the lengthwise axis of the transport container.

10. The conveyor installation as defined in claim 9, wherein the drive unit of each transport container embodies a drive wheel constructed as a friction wheel which is laterally offset at the region of the transverse axis and with respect to the lengthwise axis.

11. The conveyor installation as defined in claim 10, further including contact force applying means acting downwardly and upon said friction wheel, wherein the rails for the traveling wheel neighboring the friction wheel and above such traveling wheel possess an impact ledge which at most extends upto the path of movement of the entrainment means.

12. The conveyor installation as defined in claim 11, further including an adjustable stop, said friction wheel being adjustable against said adjustable stop under the action of the contact force, the impact ledge extending in diverging fashion at its terminal region with respect to the associated rail.

13. The conveyor installation as defined in claim 12, wherein each rail possesses in cross-section the shape of a sharp-cornered C, and wherein the traveling wheels and the friction wheel engage upon an intermediate web of the rail, each said rail being providing with inwardly directed marginal ledges which engage over the traveling wheels.

* * * * *